Patented Aug. 8, 1950

2,517,656

UNITED STATES PATENT OFFICE 2,517,656

POLYVINYL CHLORIDE PLASTICIZED WITH A CHLORINATED HYDROCARBON FRACTION

André Gislon, Paris, France, assignor to Compagnie Francaise de Raffinage (Societe Anonyme), Paris, France No Drawing. Application June 10, 1946, Serial No. 675,819. In France June 11, 1945

4 Claims. (Cl. 260—33.8)

It has already been proposed to use as plasticizers aliphatic hydrocarbons with a long chlorinated chain and in particular chlorinated gas oil as produced by the hydrogenation of carbon monoxide i. e. the so called Fischer gas oil. It has been proposed in particular to chlorinate the fraction of gas oil distilling between 200 and 300° C. with contents of chlorine as high as 30 or 40% or even equal to about 60%.

Now experience shows that the chlorination products of gas oil itself or of fractions distilling between wide limits as defined hereinabove have the drawback of producing plasticized products showing a considerable exudation which prevents their use for almost all the above applications.

Now I have discovered that if on the contrary very narrow fractions are operated upon, no exudation is observed. Such fractions may be for instance the fractions comprised between 185° C. and 225° C., between 225° C. and 255° C. or between 255° C. and 285° C. or even between 285° C. and 360° C.

On the contrary if two or more of these fractions are mixed together, and used after chlorination as plasticizers, the exudation reappears. It is thus obvious that it is of interest to chlorinate narrow fractions showing a certain homogeneity.

In the second place, I have also found that the mixtures of tricresylphosphate or homologous substances with chlorinated gas oil show the property of giving the plasticized products and in particular polyvinyl chloride, mechanical properties which are superior to those obtained either with tricresylphosphate or chlorinated gas oil used alone as a plasticizer. This surprising result appears clearly from the examination of the following table.

The sample No. 1 has been plasticized with 40% of the plasticizer obtained by chlorinating with 45% of chlorine a fraction of the Fischer gas oil distilling between 225 and 255° C.

The sample No. 2 has been plasticized with 40% of the plasticizer obtained by chlorinating with 45% of chlorine a fraction of the Fischer gas oil distilling between 255 and 285° C.

Sample No. 3 has been obtained by using 20% of plasticizer No. 1 admixed with 20% of tricresylphosphate.

Sample No. 4 has been obtained by using 20% of plasticizer No. 2 admixed with 20% of tricresylphosphate.

| Samples | | Resistance R | Elongation A | Product A×R |
|---|---|---|---|---|
| | | Sq. mm. | Per cent | |
| 1 | 40% of the chlorinated fraction 225° C.-255° C. | 1.14 | 105 | 120 |
| 2 | 40% of the chlorinated fraction 255° C.-285° C. | 1.69 | 67 | 113 |
| 3 | 20% tricresylphosphate and 20% plasticizer 1. | 2.9 | 304 | 885 |
| 4 | 20% tricresylphosphate and 20% plasticizer 2. | 2.8 | 340 | 955 |

However it has been noticed that mixtures of chlorinated gas oil with tricresylphosphate do not exude. When the mixture of such substances is used, it is therefore not essential to fractionate the gas oil before chlorination.

What I claim is:

1. A composition of matter comprising polyvinyl chloride and about 20% to 40% by weight of a plasticizer comprised of chlorinated material, said chlorinated material consisting of a chlorination product of a narrow cut of an aliphatic gas oil fraction, said narrow cut distilling within a range of about 20° C.–30° C., and said gas oil from which said narrow cut is taken having a boiling range between 185° C.–360° C.

2. A composition of matter according to claim 1 wherein said chlorination product contains about 30% to 60% by weight of chlorine.

3. A composition of matter comprising polyvinyl chloride and about 20%–40% of a plasticizer consisting of tricresylphosphate and the chlorination product of a narrow cut of an aliphatic gas oil, said narrow cut distilling within a range of about 20° C.–30° C. within the gas oil boiling range which is of the order of 185° C.–360° C.

4. A composition of matter according to claim 3 wherein said chlorination product contains about 30% to 60% by weight of chlorine.

ANDRÉ GISLON.

REFERENCES CITED

The following references are of record in the file of this patent:

UNITED STATES PATENTS

| Number | Name | Date |
|---|---|---|
| 2,181,481 | Gray | Nov. 28, 1939 |
| 2,186,446 | Brazier | Jan. 9, 1940 |
| 2,316,196 | Tucker | Apr. 13, 1943 |

OTHER REFERENCES

Vinylite Co-Polymer Resins for surface coatings, page 37, published by Carbide and Carbon Chemicals Company, 1942.